United States Patent
Qi et al.

(10) Patent No.: US 7,609,646 B1
(45) Date of Patent: Oct. 27, 2009

(54) METHOD AND APPARATUS FOR ELIMINATING FALSE VOICE DETECTION IN VOICE BAND DATA SERVICE

(75) Inventors: David Cheng-Song Qi, Westford, MA (US); Yan Wang, Arlington, MA (US); Timothy G. Wade, Litchfield, NH (US)

(73) Assignee: Cisco Technology, Inc., San Jose, CA (US)

( * ) Notice: Subject to any disclaimer, the term of this patent is extended or adjusted under 35 U.S.C. 154(b) by 803 days.

(21) Appl. No.: 10/825,030

(22) Filed: Apr. 14, 2004

(51) Int. Cl.
*H04L 12/26* (2006.01)

(52) U.S. Cl. .................................... 370/252; 370/493

(58) Field of Classification Search ............... 358/402; 370/286, 352, 346, 493, 528; 379/3
See application file for complete search history.

(56) References Cited

U.S. PATENT DOCUMENTS

| | | | |
|---|---|---|---|
| 5,420,921 A | 5/1995 | Lähdemaki | |
| 5,533,121 A | 7/1996 | Suzuki et al. | |
| 5,875,246 A | 2/1999 | Houghton | |
| 6,212,374 B1 | 4/2001 | Scott et al. | |
| 6,229,846 B1 | 5/2001 | Lassig et al. | |
| 6,400,802 B1* | 6/2002 | Legare | 379/3 |
| 6,504,838 B1 | 1/2003 | Kwan | |
| 6,549,587 B1 | 4/2003 | Li | |
| 6,584,110 B1 | 6/2003 | Mizuta et al. | |
| 6,738,358 B2 | 5/2004 | Bist et al. | |
| 6,754,232 B1 | 6/2004 | Tasker | |
| 6,757,301 B1* | 6/2004 | Tsai | 370/493 |
| 6,765,931 B1 | 7/2004 | Rabenko et al. | |
| 6,993,007 B2* | 1/2006 | Gummalla et al. | 370/346 |
| 7,002,992 B1 | 2/2006 | Shaffer et al. | |
| 7,075,979 B2 | 7/2006 | Beadle et al. | |
| 7,263,107 B1 | 8/2007 | Johnston et al. | |
| 7,411,941 B2 | 8/2008 | Chu et al. | |
| 2001/0021186 A1* | 9/2001 | Ono et al. | 370/352 |
| 2001/0046259 A1 | 11/2001 | Abrishami | |
| 2002/0064139 A1 | 5/2002 | Bist et al. | |
| 2002/0080730 A1* | 6/2002 | LeBlanc | 370/286 |
| 2002/0101830 A1 | 8/2002 | LeBlanc | |
| 2002/0141392 A1 | 10/2002 | Tezuka et al. | |
| 2002/0171392 A1 | 11/2002 | Richter et al. | |

(Continued)

OTHER PUBLICATIONS

XP-002362870,"tone incoming ip/pstn ans disable echo suppressor", Online, May 11, 2004, pp. 1-9, Retrieved from Internet: URL:http://www.cisco.com/univered/cc/td/doc/product/access/acs_serv/as5850/sw_conf/tone_cli.pdf> retrieved on Jan. 12, 2006.

*Primary Examiner*—Gregory B Sefcheck
*Assistant Examiner*—Nima Mahmoudzadeh
(74) *Attorney, Agent, or Firm*—Hamilton Brook Smith & Reynolds. P.C.

(57) ABSTRACT

A system in a Voice Over Internet Protocol (VOIP) network eliminates false voice detection in voice band data service (e.g., modem or facsimile transmission) by sequentially enabling silence detection then voice detection. In Voice Band Data (VBD) mode, the system initially enables silence detection and disables voice detection. If silence is detected in a VOIP signal associated with a VOIP call, the system enables voice detection. If voice is detected, the system switches from VBD mode to voice mode and enables processing (e.g., echo cancellation and/or data compression) that improves voice communications.

40 Claims, 3 Drawing Sheets

U.S. PATENT DOCUMENTS

| | | |
|---|---|---|
| 2003/0091034 A1 | 5/2003 | Koistinen |
| 2003/0095544 A1 | 5/2003 | Chu |
| 2003/0193696 A1* | 10/2003 | Walker et al. ............... 358/402 |
| 2004/0190499 A1 | 9/2004 | Chen et al. |
| 2005/0117594 A1* | 6/2005 | Ryan ......................... 370/401 |
| 2006/0285171 A1 | 12/2006 | Ma et al. |

* cited by examiner

METHOD AND APPARATUS FOR ELIMINATING FALSE VOICE DETECTION IN VOICE BAND DATA SERVICE

BACKGROUND OF THE INVENTION

Voice over Internet Protocol (VOIP) Gateways (GWs) provide telephone voice services replacing traditional long-distance circuit switches. A traditional telephone system also provides the ability for users with modems to connect to a Remote Access Server (RAS) for digital communications over standard voice lines. This same capability is provided by VOIP Gateways through the use of a Modem Passthrough (MPT) or Voice Band Data (VBD) mode. From voice mode, after a VOIP gateway detects a 2100 Hz tone and phase reversal, it (i) switches into VBD mode by disabling its echo canceller and data compressor and (ii) uses the G.711 standard as the voice Coder/Decoder (CODEC), which provides a clear digital channel. From the VBD mode, the VOIP GW normally switches back to voice mode by sensing voice in the signal through use of a voice detector.

SUMMARY OF THE INVENTION

Unfortunately, certain modem signals cause false voice detection (interchangeably referred to herein as voice activity detection). Some modem training sequences, such as a V.90/V.92 Digital Impairment Learning (DIL) signal sequence, are not defined in International Telecommunications Union (ITU) specifications, and each client modem manufacturer can define its own sequences. Also, the DIL sequence likely contains a large variation in power level. Therefore, it is difficult for voice detectors to distinguish a real human voice from these undefined modem training sequences. The false voice detection may mistakenly cause the VOIP gateway to switch back to the voice mode, which terminates the VBD service, and, subsequently, terminates the customer modem call.

Although false voice detection in Voice Band Data (VBD) mode, followed by erroneous entry into voice mode, can be partly solved by the improvement of the voice detection algorithm in the gateway, this improvement would likely consume a large amount of CPU and memory resources and could have other unexpected negative impacts. Also, no voice detection algorithm can completely avoid false detections due to the unpredictable characteristic of some modem training sequences, especially the DIL sequence.

Because voice detection algorithms are susceptible to the unpredictable characteristics of some modem training sequences, the present invention provides a method and apparatus for eliminating false voice detection in a Voice Over Internet Protocol (VOIP) service that supports a voice band data mode and a voice mode. In one embodiment, a system employing the principles of the present invention enables silence detection and disables voice detection for a VOIP call in voice band data mode. With the silence detection enabled and voice detection disabled, the system monitors a voice band signal associated with the VOIP call for silence. In response to detecting silence, the system enables voice detection. If the voice detection is enabled (i.e., silence has been detected), the system monitors the voice band signal for voice, and, in response to detecting voice, terminates voice band data mode and enters voice mode.

Once in voice mode, voice mode "features" may be enabled, such as echo canceling, voice activity detection (independent of eliminating false voice detection of the present invention), and data compression. Thus, since modem communications continuously transmit voice band data when engaged in a VOIP call, the system prevents false voice detection by (i) monitoring the voice band signal for silence, uni- or bi-directional silence which may exceed a predetermined length of time as a first step in a process for determining whether the system should switch into voice mode and (ii) validating voice is being carried in the voice band signal.

In the case of monitoring for uni-directional silence, modem training sequences have silence periods that can extend between 250 msec and, normally, less than 4 seconds, so the predetermined length of time for determining whether uni-directional silence is found in the voice band signal may be set to at least about 4 seconds (e.g., ±1 second). In the case of monitoring for bi-directional silence, bi-directional silence in communications between two communicating modems, including during a training sequence, is expected to be less than 100 msec in normal circumstances, so the predetermined length of time for determining whether bi-directional silence is found in the voice band signal may be set to at least about 250 msec (e.g., ±100 msec). Because of the shorter time for determining silence, the preferred embodiment of the present invention monitors for bi-directional silence. Unless otherwise specified, the descriptions hereinbelow refer to bi-directional silence and a predetermined length of time of at least about 250 msec for determining whether the system should begin a second step in a process for determining whether the system should switch into voice mode, namely validating voice is being carried in the voice band signal.

In one embodiment that monitors for bi-directional silence, if the system detects silence shorter than a predetermined length of time, such as 250 msec, the system continues disabling voice detection and continues in voice band data mode. Similarly, if the system detects silence exceeding a predetermined length of time, such as 250 msec, the system enables voice detection, then, in an absence of detecting voice, the system continues in voice band data mode. Detecting continued silence may include terminating the Voice Band Data mode if the continued silence exceeds a second predetermined length of time, such as at least two seconds. Detecting silence may include detecting silence in a bi-directional manner, meaning that the system monitors silence from a first modem to a second modem and from the second modem to the first modem, in both directions. In one embodiment, the system disables echo cancellation in voice band data mode and enables echo cancellation in voice mode.

The method or apparatus may be deployed in a gateway. The gateway may be a terminating gateway or an originating gateway. Alternatively, the method or apparatus may be deployed in a network device external from a gateway, which may be, for example, deployed in the network between the terminating gateway and an answering modem.

DETAILED DESCRIPTION OF THE INVENTION

A description of preferred embodiments of the invention follows.

Figure 1:
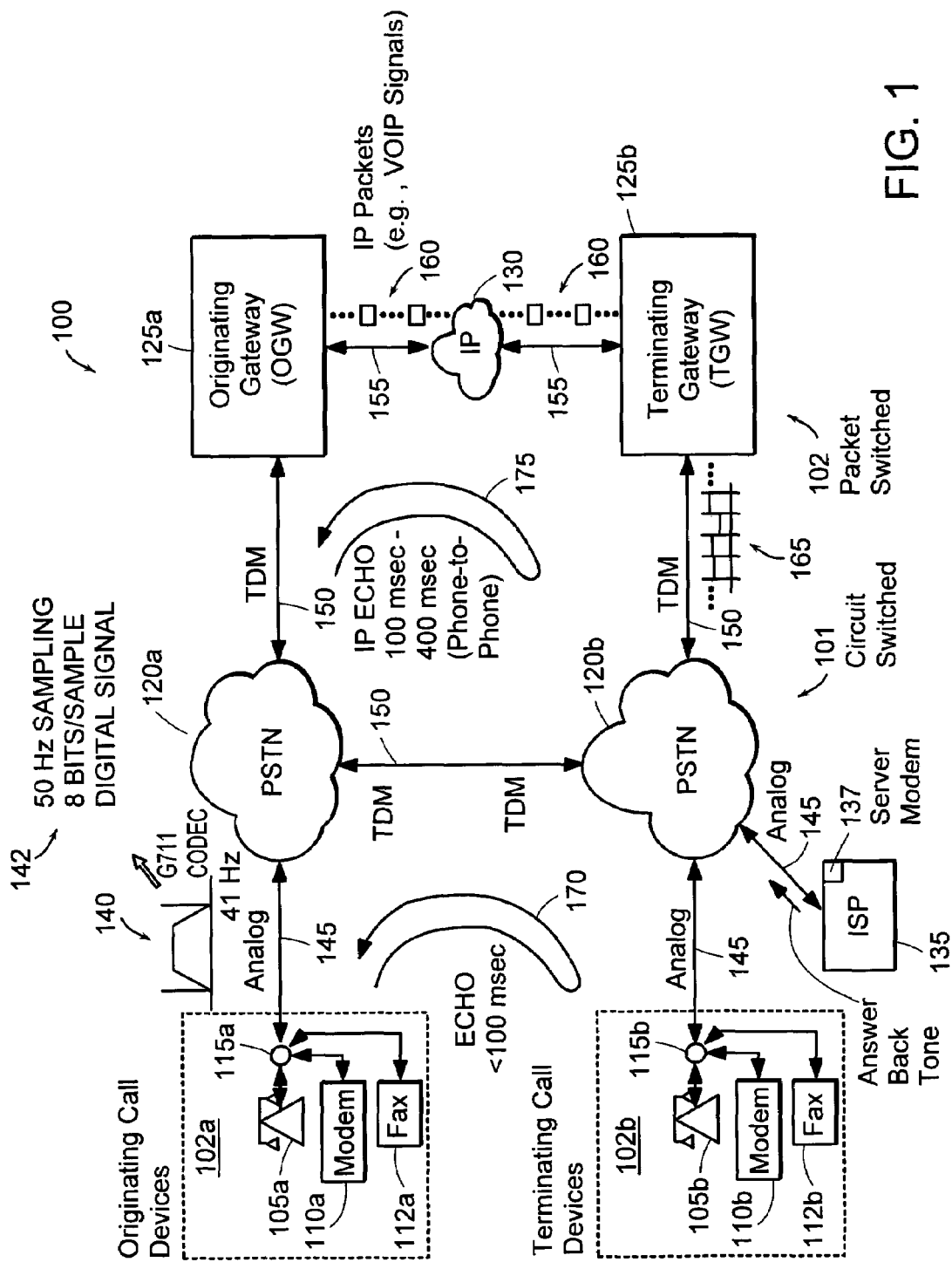
FIG. 1 is a network diagram in which the principles of the present invention are employed.

FIG. 1 is a network diagram in which an embodiment of the present invention is illustrated. A network 100 includes originating call devices (e.g., a telephone 105a, modem 110a, and facsimile ("fax") machine 112a) and terminating call devices 102b (e.g., a telephone 105b, modem 110b, and fax machine 112b). The terms "originating" and "terminating" are arbitrarily assigned herein and are used to indicate the direction in which a call is being made.

Respective couplers 115a, 115b may be used to connect the telephone 105, modem 110, and fax machine 112 onto an analog signal line 145. The analog signal line 145 connects the originating call devices 102a and terminating call devices 102b to a Public Switched Telephone Network (PSTN) 120a, 120b, respectively.

The PSTNs 120a, 120b include network devices (not shown) that convert an analog signal, typically within a 4 kHz spectrum 140, into Time Division Multiplexed (TDM) signals 165. The TDM signals 165 are transmitted between the PSTNs 120a, 120b over a TDM signal line 150. It should be noted that such TDM conversion devices can be located in other network equipment, such as digital loop carrier systems (not shown).

The portion 101 of the network 100 just described is a traditional circuit switched network 101. In this typical circuit switched network 101, echo signals 170, represented by a "round-trip" arrow, may be caused by imperfect matching between two-to-four wire hybrids (not shown) located near the originating and terminating call devices 102. In the traditional circuit switched network 101, a typical echo signal 170 takes less than 100 msec to return to the originating call devices 102a. Echo signals 170 are generally not heard by the person making the call because of the very short round-trip delay. Nevertheless, echo cancellers (not shown) are generally used to reduce the echoes.

Also shown in the network 100 of FIG. 1 is a pair of gateways 125a and 125b. An Internet Protocol (IP) network 130 supports packet switched communications between the gateways 125. The gateways 125a and 125b connect to respective PSTNs 120a and 120b via a TDM communications link 150. The gateways 125a and 125b each connect to the IP network 130 via IP links 155. The IP links 155 carry IP packets 160, which may include Voice Over Internet Protocol (VOIP) signals. The VOIP signals may be voice signals or voice band data signals (e.g., modem or fax signals). The portion 102 of the network 100 associated with the gateways 125 allows for packets switched network communications, which is becoming a less expensive means for voice and data communications than the circuit switched network communications described above.

Similar to the circuit switched network portion 101, the packet switched network portion 102 is also susceptible to echoes. IP echoes 175 generally take between 100 msec and 400 msec to make a round-trip from the originating call devices 102a to the terminating call devices 102b and back to the originating call devices 102a. Echo cancellers (not shown) are also used in the packet switched network portion 102 to reduce echoes.

According to ITU telecommunication specification G.168, when operating in VBD mode, echo suppressors and echo cancellers within a traditional, circuit switched, telecommunications network 101 are re-enabled by a bi-directional silence of 100 ms to 400 ms lengths. To comply with this specification, Voice Over Internet Protocol (VOIP) gateways (GWs) in a packet switched telecommunications network 102 operating in VBD mode also re-enable their embedded echo cancellers if they detect a long silence. In addition to re-enabling echo cancellers, traditional VOIP GWs enable a silence detector and a voice detector when operating in VBD mode. The silence detector and voice detector work independently in traditional Voice Band Data (VBD) service. The independent operation in traditional VBD service means that not only will the GW exit VBD mode in an event of silence, but a false voice detection caused by modem retraining will also cause the GW to exit VBD mode and enter voice mode. In voice mode, the modem signals are likely to cause errors in echo cancellers enabled in voice mode, and the errors will likely cause the VOIP call to terminate.

A system employing an embodiment of the present invention eliminates false voice detection in VBD mode by first enabling the silence detector and, if the silence detector detects silence in the voice band signal associated with a VOIP call, the system enables a voice detector. The system exits VBD mode and enters voice mode if the voice detector detects voice. The system is made more reliable by taking advantage of current reliable silence detectors. Implementation of a uni- or bi-directional silence detector is easy and reliable.

Control logic for the above-described process for the VBD mode may be written as the following pseudo code:

```
IF (SILENCE_DETECT= = TRUE)
    ENABLE_VOICE_DETECTOR; // disabled by default
    ENABLE_ECHO_CANCELLER; // optional
END
IF (VOICE_DETECT= = TRUE)
    SWITCH_TO_VOICE_MODE; //restore the voice configuration
END
```

Thus, a gateway or other network device employing the principles of the present invention enables the voice detector after first detecting silence. This helps to eliminate false voice detection in voice band data service.

Implementing the process just described is easy, involves low coding complexity, and avoids changing voice detector algorithm(s). In addition, this process is reliable and has negligible risk and negligible negative impact on network devices currently providing voice and voice band data services.

Continuing to refer to FIG. 1, in converting analog signals 140 to sampled digital signals 142; a coder/decoder (CODEC) (not shown) may be employed. A CODEC is an integrated circuit or electronic device combining circuits needed to convert digital signals to and from analog form. Typically, the CODEC uses a G.711 protocol, which is low in complexity and has a throughput of 64 kbits/sec. Another CODEC protocol is G.729, which has a throughput of 16 kbps, and provides possible distortion of tones but is optimized to compress voice. Another CODEC protocol is G.723, which has a throughput of 5.3 kbps or 6.3 kbps, which is also optimized to compress voice but may cause even worse distortion of tones. Because of the distortion, when the modems 110a, 110b or fax machines 112a, 112b are communicating, the echo cancellers are typically disabled to avoid communications failure. Table 1 includes a comparison between the protocols:

TABLE 1

|  | G.711 | G.729 | G.723 |
| --- | --- | --- | --- |
| Voice | Little Distortion | Little Distortion (slightly higher) | Little Distortion (even higher) |
| Modem | Typical performance | Communication fails | Communication fails |

The G.729 protocol communications may fail during modem communications because the compression algorithm affects the modem tones. Also, G.729 includes use of a Voice Activity Detector (VAD) and a voice echo canceller, which may also affect voice band modem signals and disrupt communications. To prevent communications failure, a communications system can detect modem communications signals and cause the CODEC to use a modem pass-through mode, which includes using the G.711 protocol, disabling voice activity detectors, and disabling an echo canceller.

However, in legacy applications, there are situations in which (i) modem or fax communications may be started after a voice call is begun or (ii) a voice call may follow a modem or fax communications call. For example, a person at the originating telephone 105a may call a person at the terminating telephone 105b to say that "a fax is coming" and "turn on and press 'data'" on the fax machine. In response to the request, the person at the terminating modem 110b presses the "data" button on the terminating fax machine 112b, which allows fax communications to begin (i.e., voice band data transmit). During the fax transmission, new high-speed fax machines can retrain or a person can pick-up a hand-set after (or during) a fax has been sent to ask the recipient whether the fax was successfully received or to discuss the substance of the facsimile. Thus, there are many legacy applications in which discriminating between voice and voice band data is useful so as to select a best communications protocol (e.g., G.711 or G.729).

Continuing to refer to FIG. 1, the network 100 also includes an Internet Service Provider (ISP) 135 that includes a server modem 137 connected to the PSTN 120b via an analog link 145. The server modem 137 sends an Answer Back Tone (ABT) in response to receiving a voice band data call from one of the user modems 110. During modem communications, the user modem 110 or server modem 137 may initiate a retraining of the modem signals to correct for line distortion or other noise-related effects. The modem communications may be delivered via VOIP signals 160, using the IP network 130 and are hence subject to false voice detection during modem training or retraining sequences. A process illustrated in FIG. 2 may be used to prevent the false voice detection in connection with voice band data service.

Figure 2:
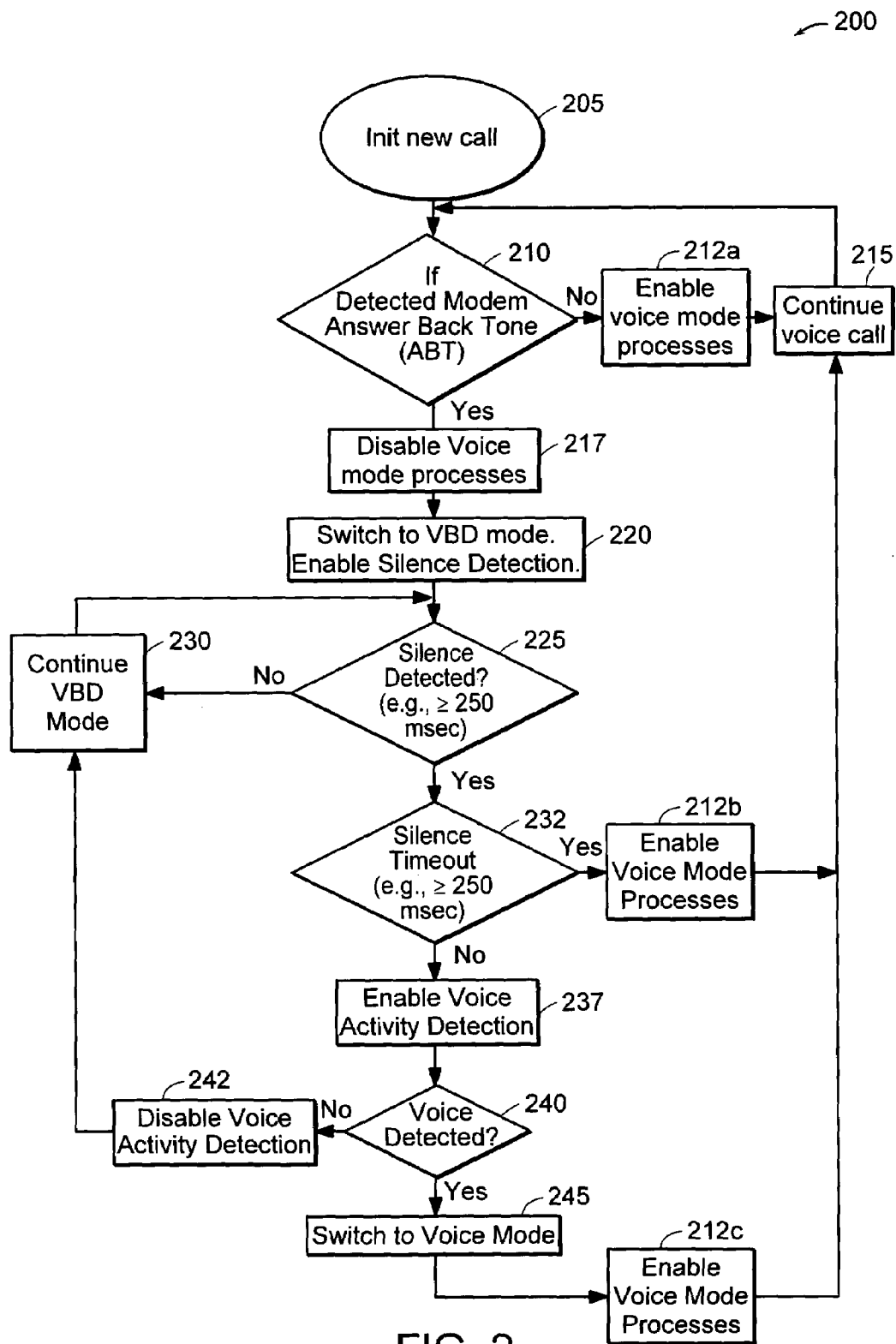
FIG. 2 is a flow diagram of a process employed in the network of FIG. 1.

FIG. 2 is a flow diagram of a process 200 according to one embodiment of the principles of the present invention that may be used in the packet switched network portion 102 of the network 100 described above. The process 200 begins when a new call is initiated (Step 205). The new call may be directed to use the packet switched portion 102 of the network 100 (i.e., gateways 125 and IP network 130). If a modem training signal is detected (Step 210), the process 200 (or apparatus (FIG. 3)) (a) disables voice mode processes (e.g., echo cancellation and data compression) (Step 217) and (b) (i) causes the channel associated with the VOIP call to switch into Voice Band Data (VBD) mode and (ii) enables silence detection (Step 220). If the modem training signal is not detected (Step 210), such as by detecting an Answer Back Tone (ABT), the process 200 (a) enables voice mode processes (Step 212a) and (b) allows the channel to continue in voice mode to service a voice call (Step 215). In voice mode, as discussed above, a protocol such as G.729 is employed, which may use data compression, voice activity detection, and voice echo cancellation.

In the case of switching to VBD mode and enabling silence detection (Step 220), the process 200 monitors the voice band signal associated with the VOIP call to determine whether silence has been detected (Step 225). In one embodiment, the silence detection may be uni- or bi-directional and is adjustable. For example, the bi-directional silence detection can be set to determine whether silence is identified in the voice band signal for at least about 250 msec. Uni-directional silence may be set for at least about 4 seconds. If no silence is detected (Step 225), the process 200 continues in voice band data mode (Step 230). This is the case, for example, when modems are communicating with each other, where tones are constantly being transmitted in one or both directions (i.e., uni-directionally or bi-directionally, respectively). If silence is detected (Step 225) in the voice band signal associated with the VOIP call, the process 200 continues and determines whether a silence time-out has occurred (Step 232) (e.g., at least 2 seconds) in connection with the VOIP call. If a silence time-out has occurred, the process 200 enables voice mode processes (Step 212b) and continues in voice mode (Step 215). A silence time-out may occur in the case where a modem or fax machine has become disabled or fails during a call or where a network device facilitating the call, such as one of the gateways 125, has become disabled or fails.

Assuming a silence time-out has not occurred (Step 232), the process 200 enables voice activity detection (Step 237) and determines whether a voice signal is detected in the voice band signal associated with the VOIP call (Step 240). Voice detectors are generally very accurate when detecting voice, but can make false detections in the presence of modem signals, as discussed above. So, if voice is not detected in the voice band signal (Step 240), the process 200 disables voice activity detection (Step 242), continues in VBD mode (Step 230), and continues monitoring the voice band signal for silence (Step 225). If voice is detected in the voice band signal (Step 240), the process 200 switches to voice mode (Step 245), enables voice mode processes (Step 212c), and allows the voice call to continue (Step 215). The process 200 thereafter monitors the voice band signal for a modem answer back tone (Step 210) and continues as discussed above in reference to detection of a modem answer back tone (Step 210).

Figure 3:
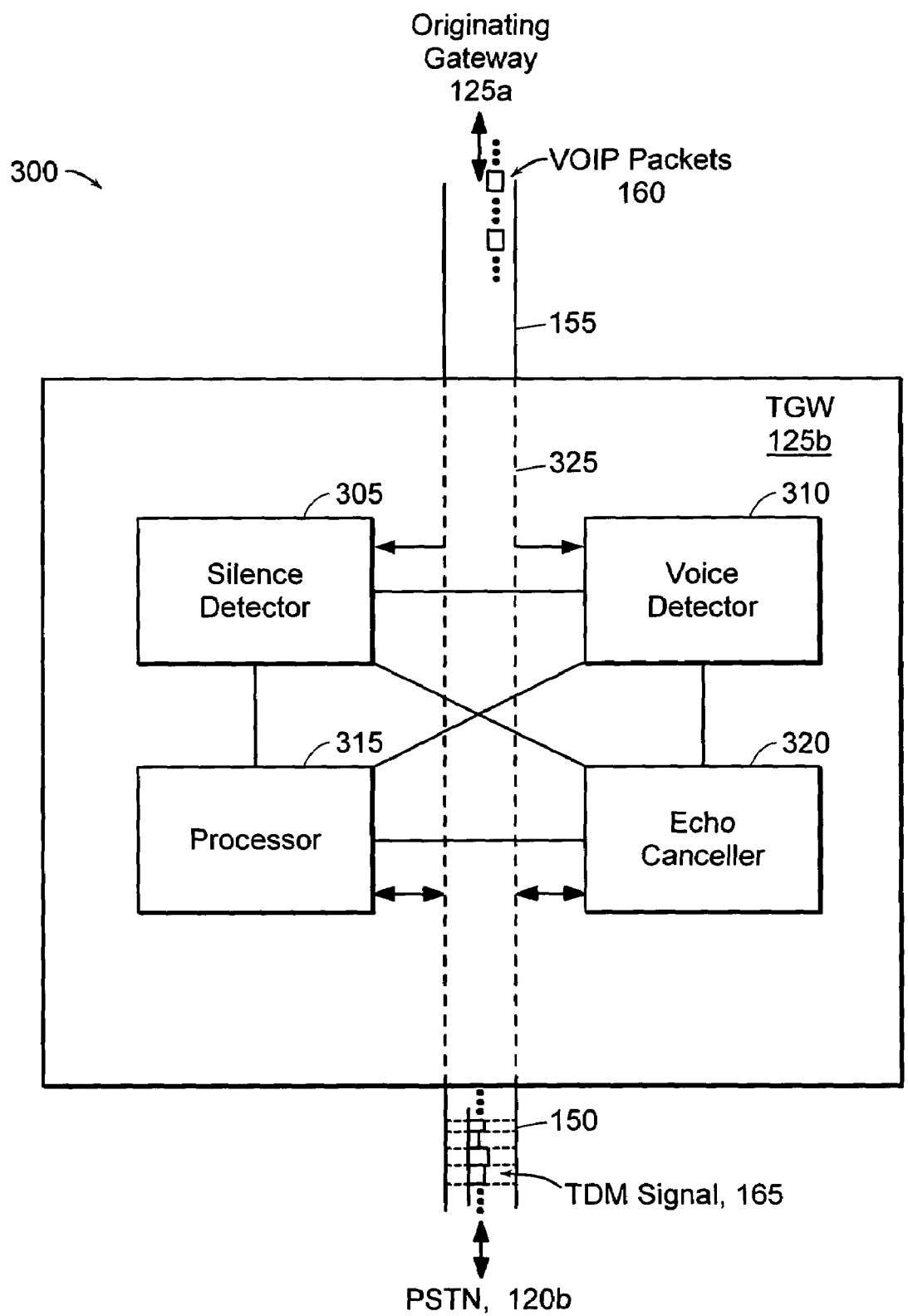
FIG. 3 is a block diagram of a network device adapted to execute the process of FIG. 2.

FIG. 3 is a block diagram of the terminating gateway 125b that includes an example of devices that may be used to implement the process 200 of FIG. 2. The terminating gateway 125b receives VOIP packets 160 from the originating gateway 125a and transmits a Time Division Multiplexed (TDM) signal 165 to the PSTN 120b. In this embodiment, the terminating gateway 125b includes four devices: a silence detector 305, voice detector 310, processor 315, and echo canceller 320. The devices may be coupled to an internal communications bus 325 in the terminating gateway 125b or to the IP link 155 or TDM link 150 to monitor voice band signals within the VOIP packets 160. The internal communications bus 325, IP link 155, or TDM link 150 may be generally referred to as a communications bus. Coupling the devices to one or more of the communications buses 325, 155, 150 may be a design or implementation choice.

The processor 315 may be independent of the silence detector 305, voice detector 310, and echo canceller 320. Alternatively, the processor 315 may execute software that performs the functions of the silence detector 305, voice detector 310, and echo canceller 320. Other embodiments may be used in which the processor 315 executes a subset of the processes of the other devices 305, 310, and 320.

In an alternative embodiment, the subsystems 305, 310, 315, and 320 are incorporated into a CODEC, which performs functions according to any number of communications protocols (e.g., G.711, G.729, etc.).

The processor 315 is connected to the silence detector 305 and voice detector 310. The processor 315 terminates voice band data mode and enters voice mode in response to voice detector's 310 detecting voice on the communications bus. The processor 315 may include configuration information for both voice and voice band data modes. For example, the processor 315 may automatically enable the echo canceller 320 when entering voice mode. The processor 315 may also be used to specify the amount of time the silence detector 305 allows (e.g., at least about 250 msec) before issuing a signal that silence has been detected in the voice band signal. Based on the indication from the silence detector 305, the processor 315 may terminate the VOIP call in a typical manner.

In operation, as discussed above in reference to the process 200, the silence detector 305 is adapted to detect silence on a communications bus and is enabled in voice band data mode. The processor 315 may include software executed to cause the processor 315 to enable the silence detector 305 in voice band data mode. Alternatively, the silence detector 305 may be enabled by another device, shown or not shown, or enabled by information in the VOIP packets 160, such as set overhead bits or commands via a control bus (not shown) used to command and configure the terminating gateway 125b.

The voice detector 310 may also be coupled to the communications bus and adapted to detect voice on the communications bus. The voice detector 310 is initially disabled in voice band data mode and enabled in response to the silence detector's 305 detecting silence in a voice band signal on the communications bus. The voice detector 310 monitors the voice band signals after being enabled.

The silence detector 305 may detect silence on the communications bus in one direction (e.g., from the terminating gateway to the originating gateway) or detect silence on the communications bus in a bi-directional manner. Uni-directional silence is normally less than 4 seconds. Bi-directional silence typically lasts no longer than 100 ms in normal modem connections and train-up or re-train sequences.

A method as described in reference to FIG. 2 or apparatus as described in reference to FIG. 3 may be deployed in the communications network 100 of FIG. 1 in various locations. For example, the method or apparatus may be deployed in a gateway 125a and 125b. A reason the method or apparatus may be deployed in the terminating gateway 125b is to monitor whether an Answer Back Tone (ABT) is in a voice band signal transmitted over the packet switched portion 102 of the network 100. In an alternative embodiment, the method or apparatus may be deployed external from the gateways 125. For example, a network device (not shown) between the terminating gateway 125b and the server modem 137 may include the method or apparatus.

The process described in reference to FIG. 2 may be embodied in hardware, firmware, or software. If implemented in software, the software may be implemented in instructions that are stored in a computer-readable medium that can be loaded and executed by a processor, such as a digital signal processor. The computer-readable medium (not shown) may be Random Access Memory (RAM), Read Only Memory (ROM), optical disk, magnetic disk, or other storage medium. In another embodiment, the software may be stored external from the network device that executes the software, in which case the software is downloaded via the IP network 130 or a control network (not shown). The processor that executes the software (i) is adapted to monitor and/or transmit/receive VOIP signals that include voice and voice band data signals and (ii) is suitable for executing processes as described hereinabove and shown in the accompanying drawings.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method operating in a device that couples circuit switched and packet switched networks for eliminating false voice detection in Voice Over Internet Protocol (VOIP) service supporting a voice band data mode and a voice mode, the method comprising:
   in voice band data mode, enabling silence detection and disabling voice detection from detecting a voice band signal associated with a VOIP call;
   monitoring the voice band signal for silence;
   while remaining in the voice band data mode with silence detection enabled, in response to detecting silence for a predetermined length of time, enabling voice detection;
   if voice detection is enabled, monitoring the voice band signal for voice; and
   in response to detecting voice, terminating voice band data mode and entering voice mode.

2. The method according to claim 1 wherein, if the silence detected is shorter than the predetermined length of time, continuing in voice band data mode and disabling voice detection.

3. The method according to claim 1 wherein, if voice detection is enabled, in an absence of detecting voice, continuing in voice band data mode.

4. The method according to claim 1 wherein detecting silence includes terminating the voice band data mode if silence exceeds a second predetermined length of time.

5. The method according to claim 4 wherein the second predetermined length of time is at least two seconds.

6. The method according to claim 1 wherein detecting silence includes detecting silence in a bi-directional manner.

7. The method according to claim 6 wherein enabling voice detection occurs in response to detecting silence for at least 250 msec.

8. The method according to claim 1 further including disabling echo cancellation in voice band data mode and enabling echo cancellation in voice mode.

9. The method according to claim 1 wherein the device is a gateway.

10. The method according to claim 9 wherein the gateway is a terminating gateway.

11. The method according to claim 9 wherein the gateway is an originating gateway.

12. The method according to claim 1 wherein the device is external from a gateway.

13. The method according to claim 12 wherein the device is between the terminating gateway and an answering modem.

14. An apparatus for eliminating false detection in a Voice Over Internet Protocol (VOIP) service supporting a voice band data mode and a voice mode, the apparatus comprising:
   a communications bus carrying voice band signals associated with a VOIP call;
   a silence detector coupled to the communications bus configured to (i) detect silence on the bus and (ii) enable in voice band data mode;
   a voice detector coupled to the bus configured to (i) detect voice on the bus, (ii) initially disable the detection of the voice band signals in voice band data mode, (iii) while remaining in the voice band data mode with the silence detector enabled to detect silence on the bus, enable voice detection in response to the silence detector's detecting silence for a predetermined length of time, and (iv) monitor the voice band signals after being enabled; and
   a processor, coupled to the silence detector and the voice detector, that terminates voice band data mode and enters voice mode in response to the voice detector's detecting voice on the communications bus.

15. The apparatus according to claim 14 wherein the processor continues in voice band data mode if the silence detector detects silence for less than the predetermined length of time.

16. The apparatus according to claim 14 wherein, if the voice detector is enabled, the processor disables the voice detector and continues in voice band data mode in an absence of an indication from the voice detector that voice is detected.

17. The apparatus according to claim 14 wherein, if the silence detector detects silence for a second predetermined length of time, the processor terminates the voice band data mode.

18. The apparatus according to claim 17 wherein the second predetermined length of time is at least two seconds.

19. The apparatus according to claim 14 wherein the silence detector detects silence on the communications bus in a bi-directional manner.

20. The apparatus according to claim 19 wherein the voice detector enables in response to the silence detector's detecting silence for at least two seconds.

21. The apparatus according to claim 14 further including an echo canceller disabled in voice band data mode and enabled in voice mode.

22. The apparatus according to claim 14 deployed in a gateway.

23. The apparatus according to claim 22 deployed in a terminating gateway.

24. The apparatus according to claim 22 deployed in an originating gateway.

25. The apparatus according to claim 14 deployed external from a gateway.

26. The apparatus according to claim 25 deployed between the terminating gateway and an answering modem.

27. A computer-readable medium having stored thereon sequences of instructions, the sequences of instructions, when executed by a digital processor, cause the processor to:
  for a Voice Over Internet Protocol (VOIP) call, enable silence detection and disable voice detection from detecting a voice band signal in voice band data mode;
  monitor a voice band signal associated with the VOIP call for silence;
  while remaining in the voice band data mode with silence detection enabled, in response to detecting silence for a predetermined length of time, enable voice detection;
  if voice detection is enabled, monitor the voice band signal for voice; and
  in response to detecting voice, terminate voice band data mode and enter voice mode.

28. The computer-readable medium according to claim 27 wherein the sequences of instructions cause the processor to continue in voice band data mode and disable voice detection if the silence detected is shorter than the predetermined length of time.

29. The computer-readable medium according to claim 27 further including instructions to cause the digital processor to continue in voice band data mode in an absence of detecting voice if voice detection is enabled.

30. The computer-readable medium according to claim 27 wherein the instructions that cause the processor to detect silence include instructions that cause the processor to terminate the voice band data mode if silence exceeds a second predetermined length of time.

31. The computer-readable medium according to claim 30 wherein the second predetermined length of time is at least two seconds.

32. The computer-readable medium according to claim 27 wherein the instructions that cause the processor to detect silence include instructions that cause the processor to detect silence in a bi-directional manner.

33. The computer-readable medium according to claim 32 wherein the instructions that cause the processor to detect silence include instructions that enable voice detection in response to detecting silence for at least about 250 msec.

34. The computer-readable medium according to claim 27 further including instructions that cause the processor to disable echo cancellation in voice band data mode and enable echo cancellation in voice mode.

35. The computer-readable medium according to claim 27 used in a gateway.

36. The computer-readable medium according to claim 35 wherein the gateway is a terminating gateway.

37. The computer-readable medium according to claim 35 wherein the gateway is an originating gateway.

38. The computer-readable medium according to claim 27 used in a network device external from a gateway.

39. The computer-readable medium according to claim 38 wherein the network device external from a gateway operates between a terminating gateway and an answering modem.

40. An apparatus for eliminating false detection in a Voice Over Internet Protocol (VOIP) service supporting a voice band data mode and a voice mode, the apparatus comprising:
  means for enabling silence detection and disabling voice detection from detecting a voice band signal for a VOIP call in voice band data mode;
  means for monitoring a voice band signal associated with the VOIP call for silence;
  means for enabling voice detection in response to detecting silence for a predetermined length of time while remaining in the voice band data mode with silence detection enabled;
  means for monitoring the voice band signal for voice if voice detection is enabled; and
  means for terminating voice band data mode and entering voice mode in response to detecting voice.

* * * * *

UNITED STATES PATENT AND TRADEMARK OFFICE
CERTIFICATE OF CORRECTION

PATENT NO. : 7,609,646 B1  
APPLICATION NO. : 10/825030  
DATED : October 27, 2009  
INVENTOR(S) : Qi et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1134 days.

Signed and Sealed this

Twelfth Day of October, 2010

David J. Kappos  
*Director of the United States Patent and Trademark Office*